(12) United States Patent
Da Pont

(10) Patent No.: US 7,353,844 B2
(45) Date of Patent: Apr. 8, 2008

(54) SOLENOID-OPERATED SAFETY VALVE DEVICE PARTICULARLY FOR A WASHING MACHINE

(75) Inventor: Paolo Da Pont, Turin (IT)

(73) Assignee: Elbi International S.p.A., Turin (IT)

( * ) Notice: Subject to any disclaimer, the term of this patent is extended or adjusted under 35 U.S.C. 154(b) by 0 days.

(21) Appl. No.: 10/599,889

(22) PCT Filed: Apr. 15, 2005

(86) PCT No.: PCT/EP2005/051674

§ 371 (c)(1),
(2), (4) Date: Oct. 12, 2006

(87) PCT Pub. No.: WO2005/100834

PCT Pub. Date: Oct. 27, 2005

(65) Prior Publication Data

US 2007/0204923 A1     Sep. 6, 2007

(30) Foreign Application Priority Data

Apr. 15, 2004   (IT) ................ TO2004A0235

(51) Int. Cl.
*E03B 1/00* (2006.01)
*G05D 16/06* (2006.01)
(52) U.S. Cl. .................. 137/613; 251/30.01
(58) Field of Classification Search ............. 137/613; 251/30.01, 30, 30.02
See application file for complete search history.

(56) References Cited

U.S. PATENT DOCUMENTS 4,697,619 A * 10/1987 Tiefenthaler ............ 137/613

FOREIGN PATENT DOCUMENTS

DE      26 00 560       7/1977
EP      0 819 918 A2    1/1998

* cited by examiner

*Primary Examiner*—Kevin Lee
(74) *Attorney, Agent, or Firm*—Sughrue Mion, PLLC

(57) ABSTRACT

The solenoid valve device (1) comprises a duct (3, 10, 10', 4) with an inlet (3) and an outlet (4) and in which are formed first and second valve seats (5, 6) in series with one another, each between a respective inlet chamber (8, 12) and an associated outlet duct (9, 13), and a first and second interception solenoid valve device (16, 17) associated with the first and second valve seat (5, 6) respectively, and each comprising a respective movable shutter (18; 28) cooperating with one of the seats (5; 6) in the associated inlet chamber (8; 12). Each interception solenoid valve device (16, 17) comprises an electromagnetic control portion (35, 50; 36, 50) which includes a movable core (35, 36) the position of which is controlled by a control winding (50; 50). The electromagnetic control portions (35, 50; 36, 50) of the interception solenoid valve devices (16, 17) are disposed parallel to an intermediate portion (10) of the duct (3, 10, 10', 4) lying between the said valve seats (5, 6) with the respective cores (35, 36) aligned and movable in opposite directional senses in a direction essentially parallel to the axis of the intermediate duct portion (10) within a single winding or control coil (50).

15 Claims, 6 Drawing Sheets

US 7,353,844 B2

SOLENOID-OPERATED SAFETY VALVE DEVICE PARTICULARLY FOR A WASHING MACHINE

BACKGROUND OF THE INVENTION

The present invention relates to a solenoid-operated safety valve device, particularly for control of the supply of a flow of a fluid, such as a gas or a liquid, to a utiliser apparatus, such as a device of the so-called "water-stop" type for the supply of water to a washing machine.

More specifically the subject of the invention is a solenoid-operated safety valve comprising a duct with an inlet and an outlet intended to be connected to a fluid source and, respectively, to a utiliser apparatus, and in which are formed first and second valve seats in series with one another, each between a respective inlet chamber and an associated outlet duct;

first and second interception solenoid valve devices associated with the first and second valve seats respectively, and each comprising a respective movable shutter which co-operates with one of the said seats; each interception solenoid valve device comprising an electromagnetic control portion including a movable core the position of which is controlled by a control winding.

In solenoid-operated safety valve devices of this type made to date the electromagnetic control portions are disposed in a direction substantially transverse the main direction of the flow of fluid in the supply duct. Consequently, such prior art solenoid-operated safety devices have a considerable transverse dimension.

Moreover, in these devices the electromagnetic control portions include respective separate and distinct control windings.

SUMMARY OF THE INVENTION

One object of the present invention is to provide a solenoid-operated safety valve which has drastically reduced dimensions, in particular in the transverse direction, and which is moreover constructionally simplified and can be made in an economically advantageous manner.

This and other objects are achieved according to the invention with a solenoid-operated safety valve device of the type specified above, characterised in that the electromagnetic control portions of the said interception solenoid valve devices are disposed parallel to an intermediate portion of the said duct lying between the valve seats, with the respective cores aligned and movable in opposite senses along a direction essentially parallel to the axis of the said intermediate portion of the duct between a single winding or control coil.

BRIEF DESCRIPTION OF THE DRAWINGS

Further characteristics and advantages of the invention will become apparent from the following detailed description given purely by way of non-limitative example, with reference to the attached drawings, in which.

DETAILED DESCRIPTION

Figure 1:
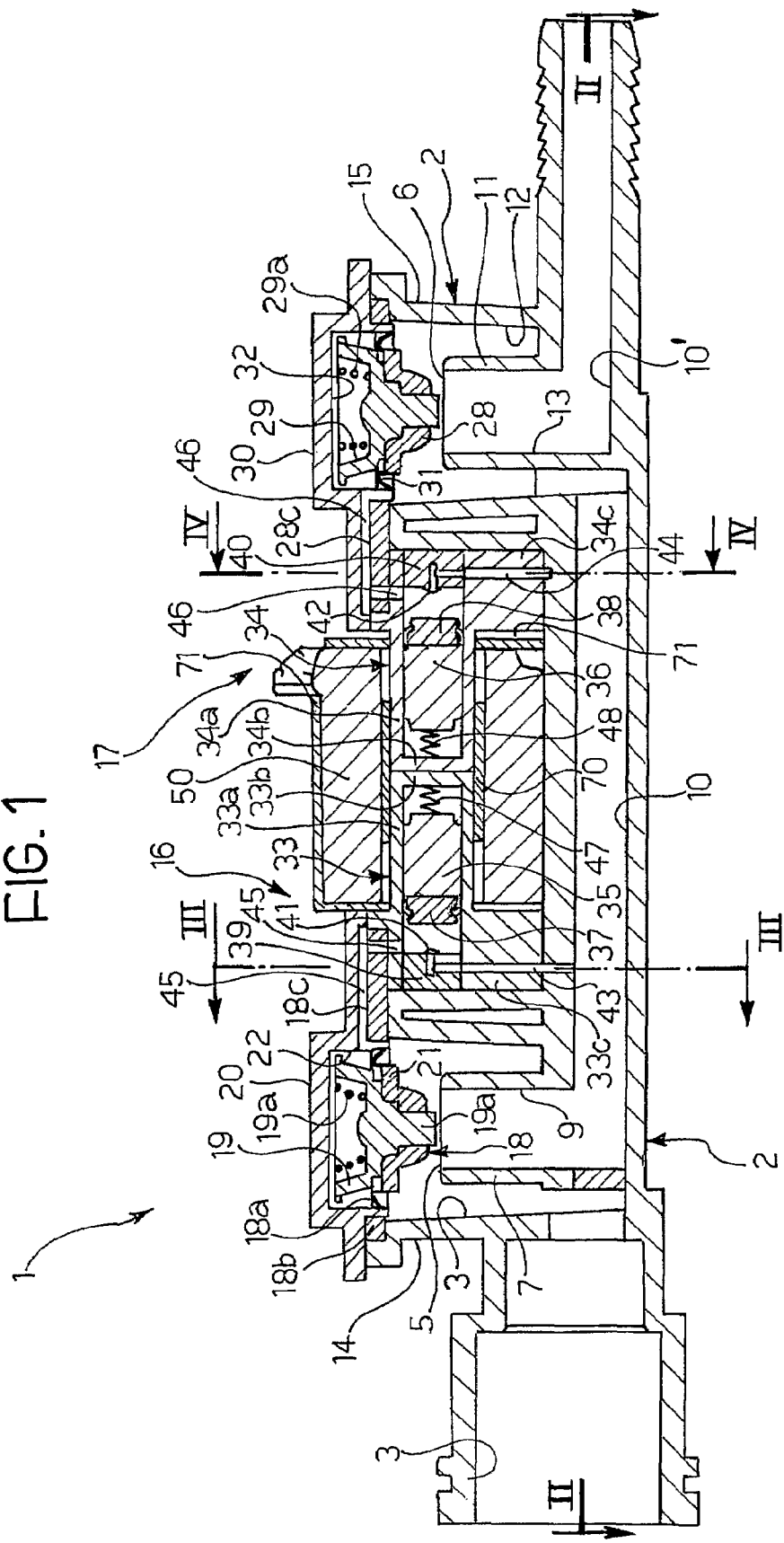
FIG. 1 is a sectional view of a solenoid-operated safety valve device according to the present invention.

In the drawings the reference numeral 1 generally indicates a solenoid-operated safety valve device according to the invention adapted for instance to control the supply of water to a washing machine, not illustrated.

In the embodiment illustrated in FIGS. 1-4 the solenoid valve device 1 comprises a body 2, for example of moulded plastics material, with an inlet connector 3 and an outlet connector 4. The inlet connector 3 is intended to be connected to a water supply source, whilst the connector 4 is intended to be connected to the washing chamber of the washing machine via a flexible tube, not illustrated.

In the body 2 are formed first and second valve seats 5 and 6, hydraulically in series with one another (FIG. 1).

The valve seat 5 is formed at the end of a tubular formation 7 integral with the body 2, the axis of which extends in a direction essentially transversely with respect to the longitudinal direction of the body 2. The said valve seat 5 is disposed between an essentially annular inlet chamber 8, communicating permanently with the inlet connector 3, and an outlet duct 9 defined within the tubular formation 7. This outlet duct 9 communicates with an intermediate portion of the duct 10 formed in the body 2 and intended to convey a flow of liquid from the duct 9 towards the valve seat 6 which is disposed hydraulically downstream.

The valve seat 6 is formed at the end of a tubular formation 11 the axis of which is also essentially transverse with respect to the longitudinal direction of the body 2. The seat 6 is disposed between an annular chamber 12, which extends around the tubular formation 11 and which communicates permanently with the intermediate duct 10, and an outlet passage or duct 13 defined within the said tubular formation. The duct 13 communicates permanently with the outlet connector 4.

With reference in particular to FIG. 1, the chambers 8 and 12 surrounding the tubular formations 7 and 11 are defined by corresponding internal formations 14 and 15 also of substantially tubular form, integral with the body 2.

The valve seats 5 and 6 are respectively associated with interception solenoid valve devices generally indicated 16 and 17 in FIG. 1.

The interception solenoid valve device 16 comprises a main movable shutter 18, for example of elastomeric material, mounted in a liquid-tight sealing manner on a projection 19a which extends from the bottom wall of a cup shape body 19.

The shutter 18 has a flexible intermediate annular portion 18a acting as a resilient membrane, and a circumferential edge 18b clamped in a liquid-tight sealing manner between the body 2 and a cover 20. The shutter 18 separates the inlet chamber 8 from an overlying pilot chamber 22 into which the cup-shape body 19 extends.

A spring 19a is disposed in the chamber 22 and tends to urge the body 19 and the shutter 18 towards the seat 5.

In FIG. 1 the reference numeral 21 indicates a narrow passage formed in the shutter 18 in a position radially outwardly of the portion of this shutter which in use engages the valve seat 5. The inlet chamber 8 is in permanent hydraulic communication through the narrow passage 21 with the overlying pilot chamber 22.

The passage 21 may possibly be formed in the body 2 rather than in the shutter 18. Similarly to what has been described above, the interception solenoid valve 17, which is situated downstream of the interception device 16, comprises a shutter 28 which is able to cooperate with the valve seat 6 and carried by a cup-shape body 29 which extends into a pilot chamber 32 upwardly delimited by a cover 30. A spring 29a tends to press the body 29 and the associated shutter 28 towards the valve seat 6. In the shutter 28 there is formed a narrow passage 31 which puts the inlet chamber 12 into permanent hydraulic communication with the pilot chamber 32.

Between the two essentially tubular formations 14 and 15 of the body 2 are disposed two shaped bodies of electrically insulating material indicated 33 and 34 in FIG. 1. These shaped bodies have respective tubular formations 33a and 34a aligned with and parallel to the intermediate duct 10 of the body 2. The adjacent ends of these tubular formations are closed by respective contiguous transverse walls 33b and 34b.

Straddling the tubular formations 33a and 34a extends a small tube 70 of ferromagnetic material.

In the axially aligned passages defined within the tubular formations 33a and 34a of the bodies 33 and 34 are mounted respective movable ferromagnetic cores 35 and 36 which at their opposite ends carry respective shutter members 37 and 38.

Figure 4:
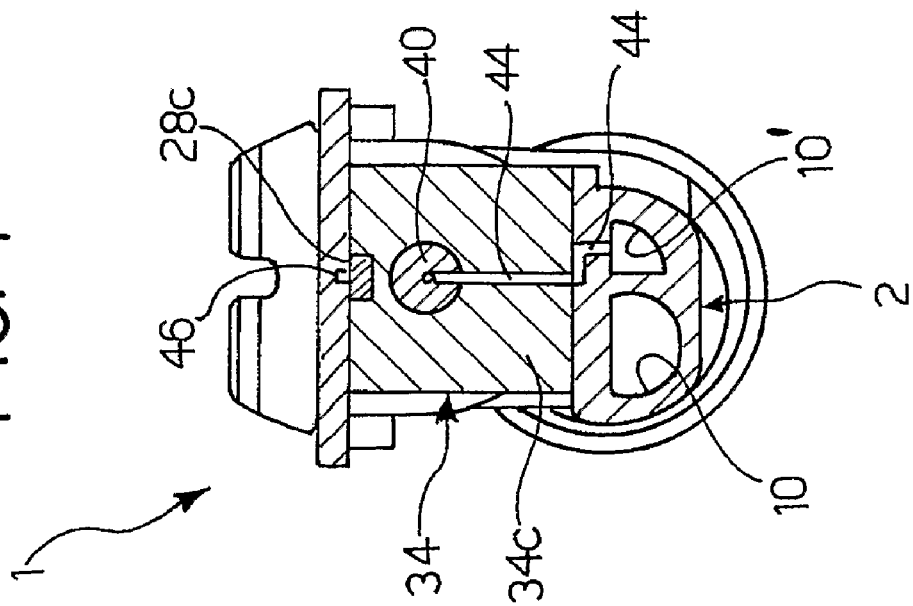
FIGS. 3 and 4 are section views taken on the lines III-III and IV-IV respectively of FIG. 1.
Figure 3:
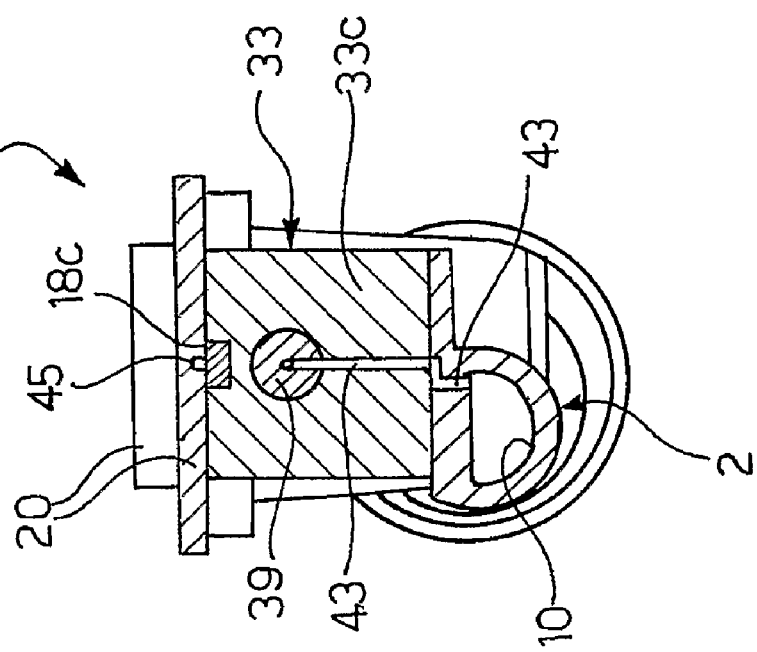

The bodies 33 and 34 have respective heads 33c and 34c which extend below the covers 20 and 30 of corresponding radial projections 18c and 28c of the shutters 18 and 28 (FIGS. 1, 3 and 4).

Disposed in the heads 33c and 34c of the bodies 33 and 34, in facing relation to the shutters 37 and 38 carried by the cores 35 and 36 are respective fixed inserts 39 and 40 in which are formed respective valve seats 41 and 42.

The reference numerals 43 and 44 in FIGS. 1, 3 and 4 indicate two discharge passages which extend between the valve seat 41 and the intermediate duct 10 and, respectively, between the valve seat 42 and a portion of the duct 10' (FIGS. 1, 2 and 4) transversely offset with respect to the duct portion 10. The duct portion 10' communicates with the outlet connector 4.

Figure 2:
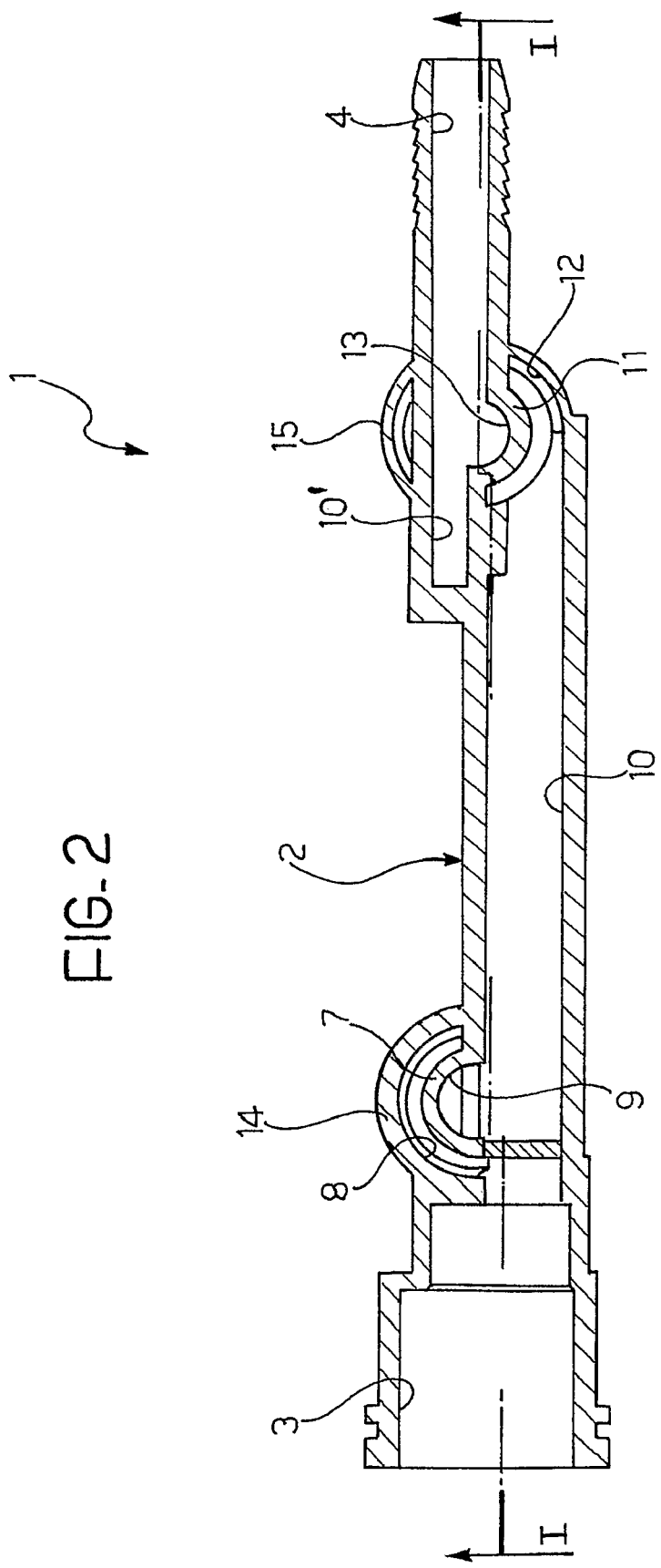
FIG. 2 is a section view taken on the line II-II of FIG. 1.

In relation to FIG. 1 it is observed that the view presented here is sectioned essentially along the broken line indicated I-I of FIG. 2, so that the duct portions 10 and 10' of FIG. 1 appear as if they were axially aligned, whilst they are in reality transversely offset as can be seen in FIGS. 2 and 4. The discharge duct 43 is formed partly in the insert 39, partly in the underlying portion of the head 33c of the shaped body 33, and partly in the wall of the body 2 which upwardly delimits the intermediate passage 10 (FIGS. 1 and 3).

Similarly, the discharge duct 44 extends partly in the insert 40, partly in the underlying portion of the head 34c of the shaped body 34, and partly in the wall of the body 2 which upwardly delimits the duct portion 10' (FIGS. 1 and 4).

Now, again making reference to FIG. 1, the pilot chambers 22 and 32 communicate with the regions lying between the shutters 37 and 38 and the associated valve seats 41 and 42 through respective passages 45 and 46 formed partly between the covers 20 and 30 and the underlying projections 18c and 28c of the shutters 18 and 28, and partly in the heads 33c and 34c of the shaped bodies 33 and 34 (FIGS. 1, 3 and 4).

The reference numeral 50 in FIG. 1 indicates a control winding disposed around the aligned and contiguous tubular formations 33a and 34a of the shaped bodies 33 and 34. This winding has an axial extent such as to allow it to cooperate operatively with both the ferromagnetic cores 35 and 36 against the action of corresponding springs 47 and 48 (FIG. 1); it is enclosed by a ferromagnetic envelope/casing 71 which, with the small tube 70, serves to close the flux generated by the said winding. The tube 70 preferably has a length such that its ends are close to those of the cores 35 and 36 when these, in the de-excited condition of the coils 50, are disposed in the extracted position with the respective shutters 37 and 38 which close the valve seats 41 and 42.

The springs 47 and 48 act on the cores 35 and 36 in the sense such as to tend to press them against the associated valve seats 41 and 42.

In FIG. 1 the shutters 18 and 28 are shown in the condition in which they release the associated valve seats 5 and 6. Further, in FIG. 1 the ferromagnetic cores 35 and 36 are shown in the condition which they assume when the winding 50 is excited and the associated shutters 37 and 38 release the corresponding valve seats 41 and 42.

In operation, when the solenoid valve device 1 as a whole is at rest (winding 50 de-excited) the shutters 18 and 28 close the associated valve seats 5 and 6, and the shutters 37 and 38 close the associated seats 41 and 42. In these rest conditions the communication between the inlet connector 3 and the outlet connector 4 of the body 2 is doubly intercepted by means of the shutters 18 and 28. In the inlet chamber 8 there is water under pressure, as also in the pilot chamber 22 by the effect of the bleeding of water through the restricted passage 21. The shutter 18 is maintained against the valve seat 5 by the effect of the pressure acting on it in the pilot chamber 22, which acts on a greater surface than the surface on which the pressure in the annular chamber 8 acts.

When it is necessary to supply a flow of water to the washing machine to which the solenoid-operated safety valve device 1 is connected, a control unit of the machine cause energisation of the winding 50. As a consequence the cores 35 and 36 are "sucked" into the winding (50), one towards the other, against the action of the associated biasing springs 47 and 48. Consequently the pilot chambers 22 and 32 are put into communication with the duct portions 10 and 10' respectively through the associated discharge ducts 43 and 44.

The drop in pressure in the pilot chamber 22 causes the shutter 18 to be raised by the effect of the hydraulic pressure which exists in the annular chamber 8 underlying it. This shutter is therefore raised and the inlet connector 3 is put into communication with the outlet passage 9, the intermediate duct portion 10 and the chamber 12 underlying the shutter 28. This shutter 28 is also now raised, and the annular chamber 12 is put into communication with the outlet passage 13, the duct portion 10' and the outlet connector 4. The solenoid device 1 as a whole is now completely open to the flow of water intended for the washing machine.

When the delivery of water to the washing machine must be interrupted the winding 50 is de-energised. Consequently the shutters 37 and 38 carried by the movable cores 35 and 36 move to close the associated valve seats 41 and 42, disconnecting the discharge ducts 43 and 44 from the associated pilot chambers 22 and 32. An hydraulic pressure now progressively accumulates in the pilot chamber 32 by the effect of the bleeding of water through the restricted passage 21 until the shutter 18 is again pressed to close the valve seat 5. Similarly, the shutter 28 is also carried to engage again the valve seat 6.

As the above description will make apparent, the winding 50, the movable core 35, the shutter 37 and the valve seat 41 together form a piloting solenoid valve for the operative control of the discharge duct 43. Similarly the winding 50, together with the movable core 36, the shutter 38 and the valve seat 42 form a piloting solenoid valve for the control of the discharge duct 44.

In the above-described solenoid-operated safety valve device according to the invention these piloting solenoid valves share the control winding 50 and are advantageously disposed parallel to the intermediate portion 10 of the body 2 lying between the valve seats 5 and 6. This arrangement makes it possible drastically to reduce the transverse dimensions of the solenoid-operated safety valve device 1 as a whole. Moreover, the use of a single winding 50 for the two piloting solenoid valves is advantageous both from the point of view of structural simplification and from the point of view of the simplification of the piloting connections.

The winding 50 can be energised with an AC voltage or with a pulsed DC voltage, for example a pulse width modulated (PWM) signal, to allow for example a regulation of essentially proportional type of the flow rate through at least one of the two valves.

Figure 5:
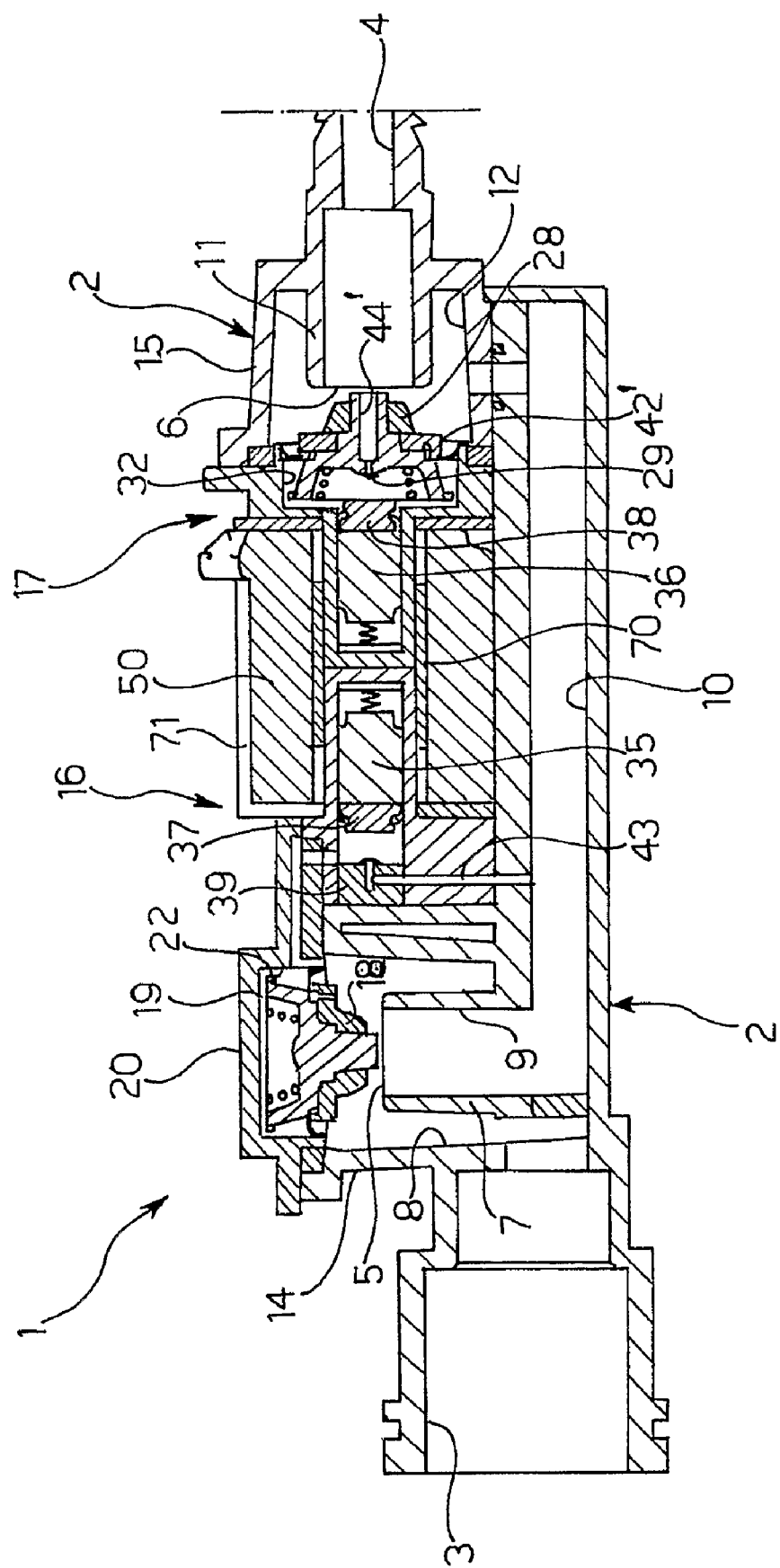
FIGS. 5 and 6 are section views similar to that of FIG. 1 and show two variant embodiments.
Figure 6:
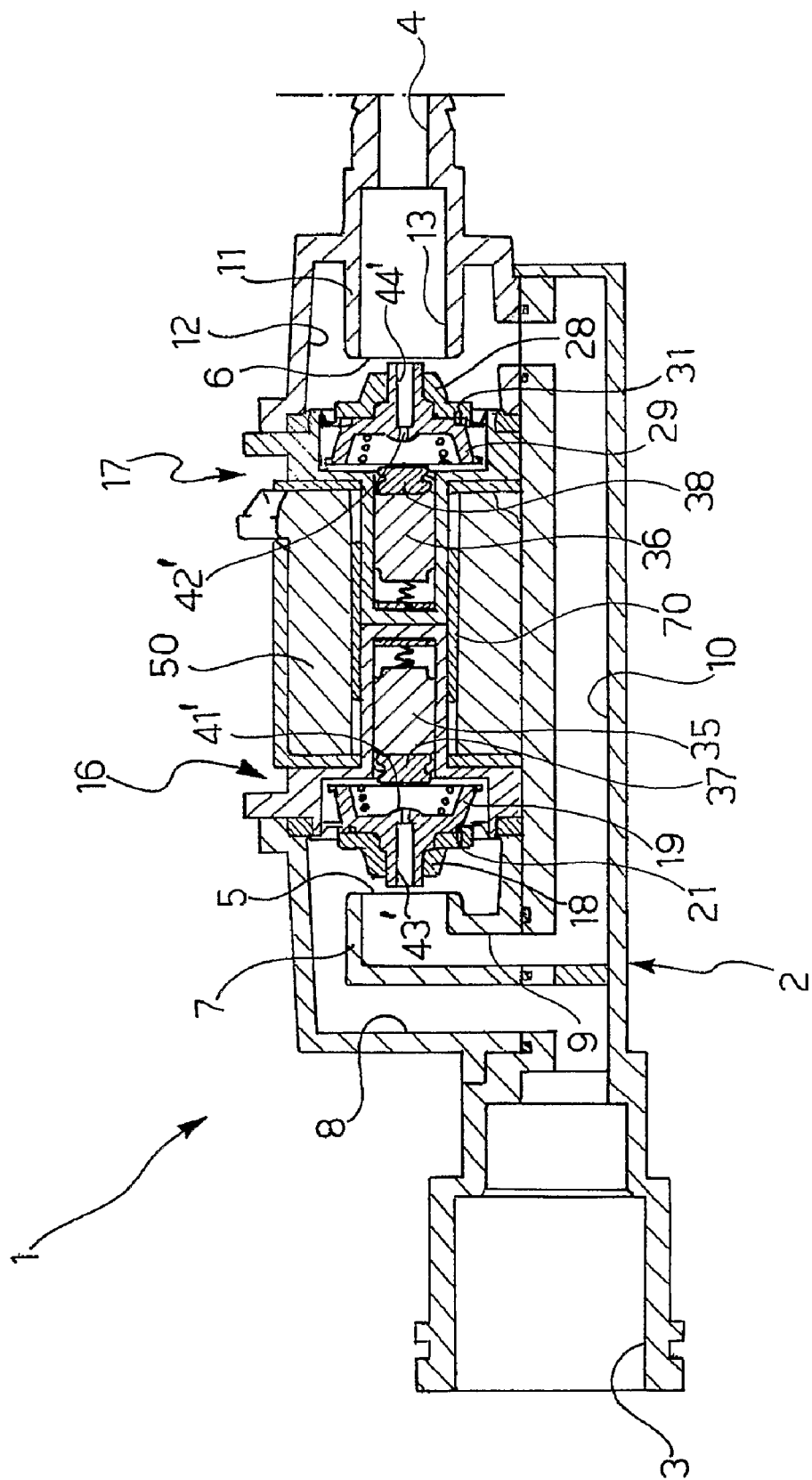

In FIGS. 5 and 6 are shown two variant embodiments in which parts and elements which are the same or substantially equivalent to parts already described have been again attributed the same reference numerals as previously utilised.

In the device according to FIG. 5 the tubular formation 11, the corresponding seat 6 and the body 29 with the associated shutter 28 are orientated at about 90° with respect to the device of FIGS. 1-4. The shutter 38 carried by the movable core 36 cooperates with a valve seat 42' formed in the body 29 at one end of a discharge duct 44' which is formed axially in this body and which opens into the interior of the tubular formation 11.

The device according to FIG. 5 works in a similar manner to that of the device of FIGS. 1-4.

In the device according to FIG. 6 both the valve seats 5 and 6 and the associated bodies 19, 29 and shutters 18, 28 are orientated by 90° with respect to the device of FIGS. 1-4, and the shutters 37 and 38 cooperate with the valve seats 41' and 42' formed in the bodies 19 and 29 at one end of corresponding discharge ducts 43' and 44' formed in these bodies.

Figure 7:
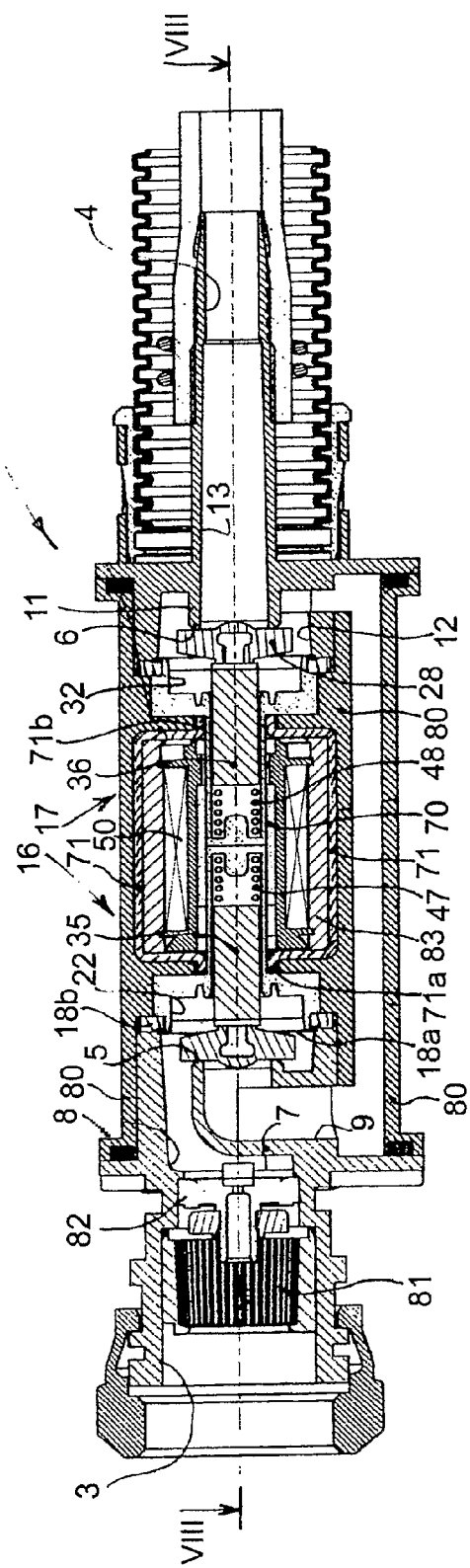
FIG. 7 is a section view of a further variant embodiment.
Figure 8:
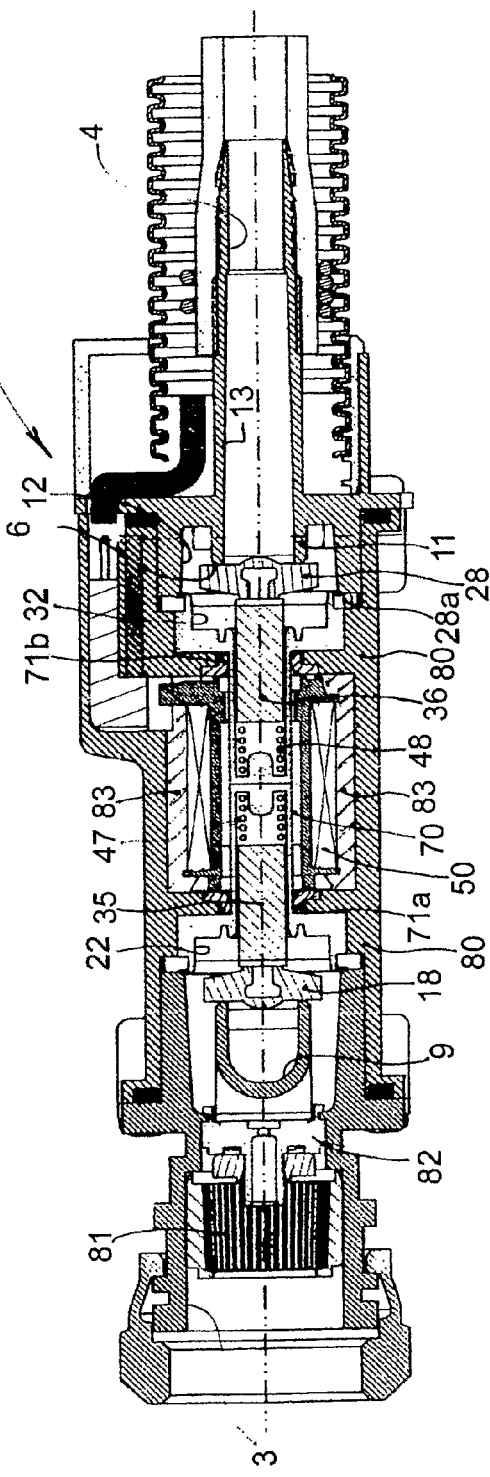
FIG. 8 is a section view taken on the line VIII-VIII of FIG. 7.

In FIGS. 7 and 8 there is shown a further variant embodiment of the device according to the invention. Also in these figures parts and elements which are the same or essentially corresponding to parts and elements already described have been again attributed the same reference numerals as previously utilised.

The solenoid-operated safety valve device 1 according to FIGS. 7 and 8 comprises two interception solenoid valve devices 16 and 17 of the so-called "direct" type, namely having no piloting electrovalve. In the illustrated embodiment the valve seats 5 and 6 extend both at 90° with respect to the longitudinal direction of the duct 10, and the associated shutters 18 and 28 are mounted directly on the movable cores 35 and 36.

The duct 10 is obtained, in a moulding operation, in an intermediate body 80, made of a plastic material and overmoulded around the winding 50 and the associated casing 71. The latter conveniently has end portions 71a, 71b which are bent towards the outside, so that the casing 71 can be made in one piece. This also allows to avoid non-controllable gaps and improves the reliability.

In the inlet connector 3 there is disposed a filter 81 and, downstream thereof, a flow rate regulator 82. Conveniently, as it can be seen in FIG. 8, the latter is bayonet-coupled to a reduced end section of the inlet connector 3. This regulator is thus positioned in a more stable and reliable way with respect to the traditional solutions based on a mere interference-fitting.

The solution according to FIGS. 7 and 8 is furthermore particularly advantageous because the intermediate portion can be obtained in two successive overmoulding operation of plastic materials (to provide an insulating layer 83 around the winding 50 and, thereafter, to provide the intermediate body 80) and it is not necessary to make use of the covers 20 and 30 of the embodiments according to FIGS. 1-5.

Although not illustrated in the drawings, also "mixed" embodiments are possible, in which one of the interception solenoid valves, 16 or 17, is of the kind having a piloting electrovalve and the other is of the "direct" type, i.e. without a piloting electrovalve.

Naturally, the principle of the invention remaining the same, the embodiments and details of construction can be widely varied with respect to what has been described and illustrated purely by way of non-limitative example, without by this departing from the ambit of the invention as defined in the annexed claims.

The invention claimed is:

1. A solenoid-operated safety valve device (1) for control of the supply of a flow of a fluid, such as a gas or a liquid, to utiliser apparatus, comprising
a duct (3, 10, 10', 4) with an inlet (3) and an outlet (4) intended to be connected to a fluid source and to the utiliser apparatus, respectively, and in which are formed first and second valve seats (5, 6) in series with one another, each between a respective inlet chamber (8, 12) and an associated outlet duct (9, 13);
first and second interception solenoid valve devices (16, 17) associated with the first and second valve seat (5, 6) respectively, and each comprising a respective movable shutter (18; 28) cooperating with one of said seats (5; 6); each interception solenoid valve device (16, 17) comprising an electromagnetic control portion (35, 50; 36, 50) which includes a respective movable core (35, 36) the position of which is controlled by a control winding (50); the solenoid-operated safety valve device being characterised in that the electromagnetic control portions (35, 50; 36, 50) of said interception solenoid valve devices (16, 17) are disposed parallel to an intermediate portion (10) of said duct (3, 10, 10', 4) lying between said valve seats (5, 6) with the respective cores (35, 36) aligned and movable in opposite directional senses along a direction essentially parallel to the axis of said intermediate portion of the duct (10), within a single winding or control coil (50).

2. A solenoid-operated safety valve device according to claim 1, in which
each movable shutter (18; 28) is interposed between the associated inlet chamber (8; 12) and a pilot chamber (22; 32) which communicates with said inlet chamber (8; 12) via a restricted passage (21; 31) and which can be put into communication with the associated outlet duct (9, 10; 13, 10') via a discharge passage (43; 44) controlled by a piloting solenoid valve (35, 37, 41, 50; 36, 38, 42, 50) which includes a shutter (37; 38) carried by a movable core (35, 36) the position of which is controlled by a control winding (50; 50);
said piloting solenoid valves (33, 37, 41, 50; 36, 38, 42, 50) being disposed parallel to an intermediate portion (10) of said duct (3, 10, 10', 4) lying between said valve seats (5, 6).

3. A solenoid-operated safety valve device according to claim 2, in which said valve seats (5, 6) are orientated in a direction forming an angle, of about 90°, with respect to the axial direction of said intermediate duct portion (10).

4. A solenoid-operated safety valve device according to claim 2, in which the upstream valve seat (5) is orientated in a direction forming an angle, of about 90°, with respect to the axial direction of said intermediate duct portion 10), and the downstream valve seat (6) is orientated in a direction substantially parallel to the axial direction of said intermediate duct portion (10).

5. A solenoid-operated safety valve device according to claim 1, in which said valve seats (5, 6) are orientated in directions substantially parallel to the axial direction of said intermediate duct portion (10).

6. A solenoid-operated safety valve according to claim 2, in which said valve seats (5, 6) are orientated in directions substantially parallel to the axial direction of said intermediate duct portion (10).

7. A solenoid-operated safety valve device according to claim 3, in which the discharge passage (43) associated with the upstream piloting solenoid valve (35, 37, 41, 50) opens into said intermediate duct portion (10).

8. A solenoid-operated safety valve device according to claim 7, in which the discharge passage (44) associated with the downstream piloting solenoid valve (36, 38, 42, 50) opens into a second duct portion (10') which is transversely offset with respect to said intermediate duct portion (10) and which communicates with the outlet connector (4).

9. A solenoid-operated safety valve device according to claim 8, in which said second duct portion (10') has an inlet end alongside the outlet end of said intermediate duct portion (10) and the discharge passage (44) associated with the downstream piloting solenoid valve (36, 38, 42, 50) opens into the inlet end of said second duct portion (10') at a point geometrically upstream and hydraulically downstream of the outlet end of said intermediate duct portion (10).

10. A solenoid-operated safety valve device according to claim 4, in which the or each discharge passage (44'; 43', 44') controlled by the piloting solenoid valve (17; 16, 17) associated with a valve seat (6; 5, 6) orientated in an inclined direction with respect to the axial direction of said intermediate duct portion (10) is formed through the shutter (28; 18, 28) correspondingly associated with the valve seat (6; 5, 6).

11. A solenoid-operated safety valve device according to claim 1, wherein the shutters (18, 28) of the interception solenoid valve devices (16, 17) are connected to said movable cores (35, 36).

12. A solenoid-operated safety valve device according to claim 1, wherein said intermediate duct portion (10) is obtained in a moulding operation, in an intermediate body (80) of plastic material overmoulded around said control winding (50).

13. A solenoid-operated safety valve device according to claim 11, wherein a ferromagnetic casing (71) made in one piece is associated with the control winding (50).

14. solenoid-operated safety valve device according to claim 1, wherein to the inlet connector (3) there is associated a flow rate regulator (82) bayonet-fitted in a seat of said inlet connector (3).

15. A solenoid-operated safety valve device according to claim 1, in which a tubular element (70) of ferromagnetic material within which said cores (35, 36) are movably mounted extends into said winding or coil (50), this tubular element (70) having an axial extent such that its ends are close to the cores (35, 36) in the de-excited condition of said winding or coil (50).

* * * * *